United States Patent
Koennings et al.

(10) Patent No.: US 10,842,309 B2
(45) Date of Patent: Nov. 24, 2020

(54) CONTROLLING FOOD PROCESSING STEPS OF A MULTI-FUNCTION COOKING APPARATUS AND REMOTE KITCHEN APPLIANCES

(71) Applicant: Vorwerk & Co. Interholding GmbH, Wuppertal (DE)

(72) Inventors: Maximilian Koennings, Zürich (CH); Maria Jose Resende, Lisbon (PT); Georg Hackert, Bochum (DE); Julius Ganns, Wuppertal (DE); Stefan Hilgers, Essen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/850,506

(22) Filed: Apr. 16, 2020

(65) Prior Publication Data
US 2020/0237133 A1 Jul. 30, 2020

Related U.S. Application Data

(63) Continuation of application No. 15/427,985, filed on Feb. 8, 2017, now Pat. No. 10,660,465.

(30) Foreign Application Priority Data

Feb. 9, 2016 (EP) .................................... 16154882

(51) Int. Cl.
*A47J 27/00* (2006.01)
*G05B 19/418* (2006.01)
(Continued)

(52) U.S. Cl.
CPC ............ *A47J 27/002* (2013.01); *G05B 15/00* (2013.01); *G05B 19/0426* (2013.01);
(Continued)

(58) Field of Classification Search
None
See application file for complete search history.

(56) References Cited

U.S. PATENT DOCUMENTS

| 4,390,965 A | 6/1983 | Albert | |
|---|---|---|---|
| 6,121,593 A * | 9/2000 | Mansbery | F24C 7/08 |
| | | | 219/679 |

(Continued)

FOREIGN PATENT DOCUMENTS

| CN | 102809932 A | 12/2012 |
|---|---|---|
| CN | 203324712 U | 12/2013 |

(Continued)

OTHER PUBLICATIONS

English translation of First Office Action for Chinese Application No. 201710070896.4, dated Jan. 23, 2019, 20 pages.

(Continued)

*Primary Examiner* — Matthew D Krcha
(74) *Attorney, Agent, or Firm* — Brake Hughes Bellermann LLP

(57) ABSTRACT

A control system, method and computer program product for controlling food processing steps performed by a multi-function cooking apparatus and food processing steps performed by one or more remote kitchen appliances for preparing a food product. A recipe program interface is configured to access on a data storage device a recipe program for preparing the food product wherein the recipe program is configured to be executed by the cooking apparatus and to synchronize food processing steps performed by the cooking apparatus with food processing steps performed by the one or more remote kitchen appliances. A validation component is configured to check if the one or more remote kitchen appliances are registered with the cooking apparatus in an appliance registry, and is further configured to check (Continued)

if technical specifications of registered remote kitchen appliances comply with control parameters in respective recipe program instructions.

17 Claims, 8 Drawing Sheets

(51) Int. Cl.
    *G05B 15/00*     (2006.01)
    *G05B 19/042*     (2006.01)

(52) U.S. Cl.
    CPC ............... *G05B 19/41815* (2013.01); *G05B 2219/2613* (2013.01); *G05B 2219/2643* (2013.01)

(56) References Cited

U.S. PATENT DOCUMENTS

| | | |
|---|---|---|
| 6,249,710 B1 | 6/2001 | Drucker et al. |
| 6,837,148 B1 | 1/2005 | Deschenes et al. |
| 10,387,499 B2 | 8/2019 | Kuroyama et al. |
| 2002/0128728 A1* | 9/2002 | Murakami .......... H04L 41/0677 700/10 |
| 2004/0058706 A1 | 3/2004 | Williamson et al. |
| 2015/0294225 A1 | 10/2015 | Takei et al. |
| 2015/0334785 A1 | 11/2015 | Visher et al. |
| 2016/0174748 A1* | 6/2016 | Baldwin ............... A47J 36/321 426/231 |

FOREIGN PATENT DOCUMENTS

| | | | |
|---|---|---|---|
| CN | 104133386 A | 11/2014 | |
| CN | 104133387 A | 11/2014 | |
| DE | 102008009659 A1 | 8/2009 | |
| EP | 1635120 A2 | 3/2006 | |
| EP | 2169493 A1 | 3/2010 | |
| EP | 2615512 A1 | 7/2013 | |
| EP | 2822226 A1 | 1/2015 | |
| GB | 2251960 A * | 7/1992 | ............. A47J 27/14 |
| GB | 2251960 A | 7/1992 | |
| WO | 2015051446 A1 | 4/2015 | |
| WO | 2015135031 A1 | 9/2015 | |
| WO | 2015182067 A1 | 12/2015 | |
| WO | 2016000463 A1 | 1/2016 | |
| WO | WO-2016000463 A1 * | 1/2016 | ............. G05B 19/04 |

OTHER PUBLICATIONS

Notice of Opposition and Opposition Brief filed in EP Patent No. 3206096 on Apr. 26, 2019, 38 pages.

Notice of Opposition and Opposition Brief filed in EP Patent No. 3206096 on Apr. 30, 2019, 31 pages.

Simon, Richard et al., "Sams Teach Yourself Visual C++.NET", Sams Publishing, 2002, 3 pages.

* cited by examiner

160

| cooking apparatus ID | RKA ID | function (technical capability) | technical specification ID |
|---|---|---|---|
| 200 | 301 | baking | 150-1a |
| 200 | 301 | microwave | 150-1x |
| 200 | 302 | cooling | 150-1y |
| ... | ... | ... | ... |

601

| step | ingredient | text | code instructions |
|---|---|---|---|
| ... | | | |
| 7 | Lasagne mixed meat filling with diced onions and tomato sauce | 15 min/80°C/speed 1 | internal:<br>Time = 15<br>Temp = 80<br>Speed = 1 |
| 8 | | pre-heat oven to 220°C | external RKA baking:<br>Wait = 15<br>Temp = 220<br>Time = 6 |
| 9 | Lasagne filling + dough layers | Layering the Lasagne filling and the dough slices in an oven dish | external: RKA oven dish<br>Time = 6 |
| 10 | raw Lasagne | Place oven dish with the raw Lasagne in the pre-heated oven and cook: 25 min/220 °C | external RKA baking:<br>Temp = 220<br>Time = 25 |
| 11 | cream | Place 200 g cream in refrigerator and cool: 20 min/7 °C | external RKA: cooling:<br>Temp = 7<br>Time = 20 |
| ... | ... | ... | ... |
| 15 | cream | Place 200 g cream in bowl and beat cream | internal:<br>mode = cream<br>Time = 90 sec |
| ... | ... | ... | ... |

| step | ingredient | text | code instructions |
|---|---|---|---|
| ... | | | |
| 7 | Lasagne mixed meat filling with diced onions and tomato sauce | 15 min/80°C/speed 1 | internal:<br>Time = 15<br>Temp = 80<br>Speed = 1 |
| 8 | | pre-heat oven to 200°C | external RKA baking:<br>Wait = 15<br>Temp = 200<br>Time = 8 |
| 9 | Lasagne filling + dough layers | Layering the Lasagne filling and the dough slices in an oven dish | external: RKA oven dish<br>Time = 6 |
| 10 | raw Lasagne | Place oven dish with the raw Lasagne in the pre-heated oven and cook: 27:17 min/200 °C | external RKA baking:<br>Temp = 200<br>Time = 27:17 |
| 11 | cream | Place 200 g cream in refrigerator and cool: 20 min/7 °C | external RKA: cooling:<br>Wait = 2:17<br>Temp = 7<br>Time = 20 |
| ... | ... | ... | ... |
| 15 | cooled cream | Place 200 g cream in bowl and whip cream | internal:<br>mode = cream<br>Time = 90 sec |
| ... | ... | ... | ... |

FIG. 6B

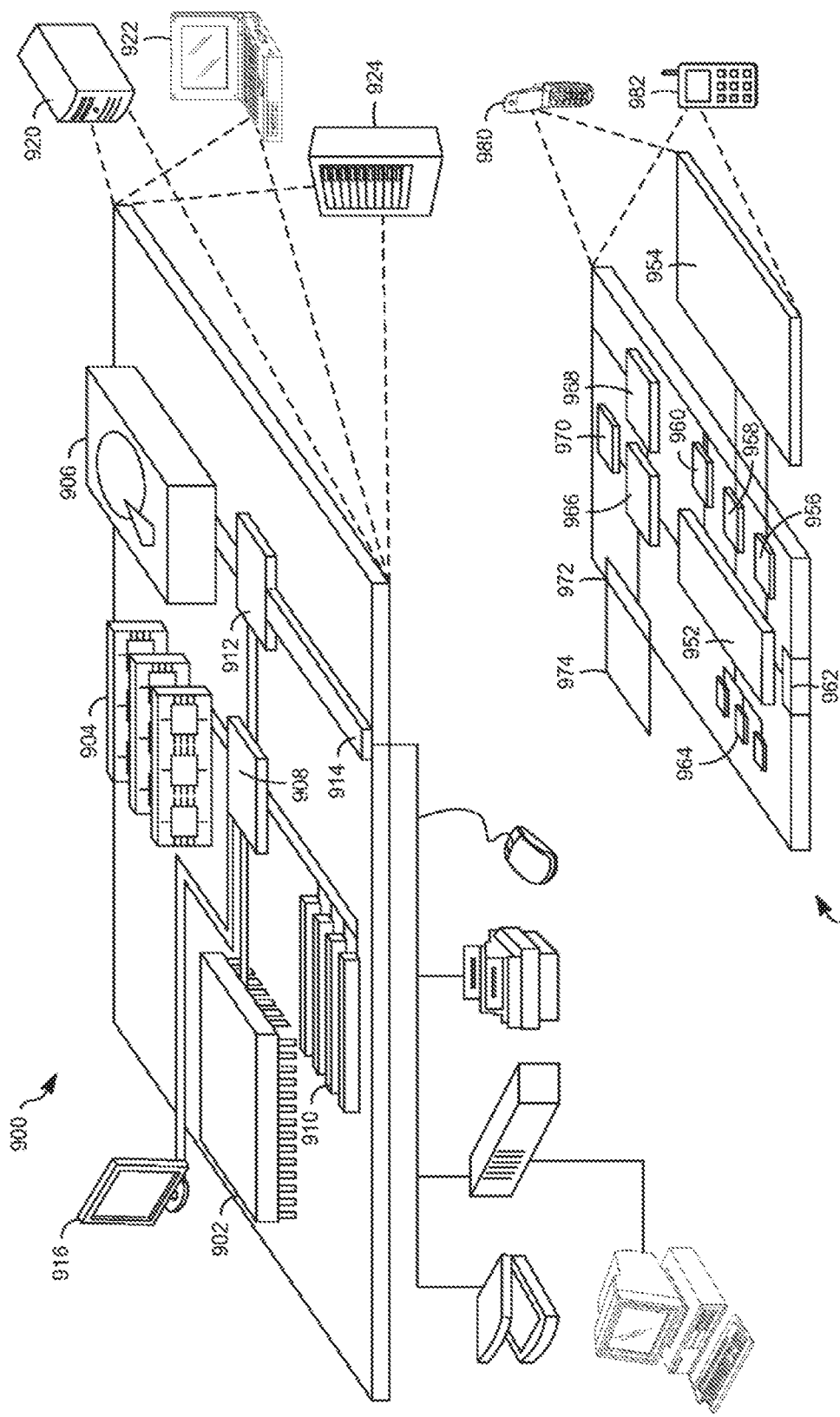

CONTROLLING FOOD PROCESSING STEPS OF A MULTI-FUNCTION COOKING APPARATUS AND REMOTE KITCHEN APPLIANCES

CROSS-REFERENCE TO RELATED APPLICATION

This application is a continuation of, and claims priority to, U.S. patent application Ser. No. 15/427,985 filed on Feb. 8, 2017, entitled "CONTROLLING FOOD PROCESSING STEPS OF A MULTI-FUNCTION COOKING APPARATUS AND REMOTE KITCHEN APPLIANCES," which claims priority to, and is a continuation of, EP16154882.1, filed on Feb. 9, 2016 and entitled "System and Method for Controlling Food Processing Steps of a Multi-Function Cooking Apparatus with Food Processing Steps of Remote Kitchen Appliances" the disclosures of which are incorporated by reference herein in their entireties.

TECHNICAL FIELD

The present disclosure generally relates to a cooking apparatus, and more particularly, relates to operating the cooking apparatus under changing operating conditions with reproducible cooking results.

BACKGROUND

Cooking apparatuses (cooking devices) have become more and more intelligent in the recent past by integrating multiple functions into the apparatus. For example, modern cooking devices integrate functions, such as heating, mixing, boiling, pureeing, etc., in a single multi-function cooking device. A cooking device typically has to be operated with appropriate technical parameter settings (e.g., temperature settings, rotational speed settings, etc.) to ensure proper operation. Proper operation of a cooking device as used hereinafter includes correct, safe and/or secure operation for producing reproducible cooking results with the cooking apparatus with regards to a particular food product. A reproducible cooking result of a particular food product is achieved when the particular food product is produced in a repeatable manner, in repetitions with quality/quantiles within a predefined tolerance range. Such a food product may include multiple food components which may be served in one or more courses of a menu.

Sometimes, the functions of such a multi-functional cooking apparatus are not sufficient to prepare the entire food product without additional kitchen appliances. In other words, sometimes the preparation of an entire food product may include the use of complementary kitchen appliances in addition to the cooking apparatus. The additional kitchen appliances may be used for performing cooking steps (e.g., operations) involving the food product or a component of the food product separated (remotely) from the multi-functional cooking apparatus. Such kitchen appliances are referred to as "remote kitchen appliances" hereinafter. "Remote" in this context therefore stands for physically not integrated with the cooking apparatus.

A desired cooking result of a particular food product is defined as the cooking result which is provided by the cooking apparatus in cooperation with the one or more remote kitchen appliances when being operated in accordance with a predefined recipe program for the food product under predefined operating conditions of the cooking apparatus and the remote appliances (e.g., maximum heating/cooling power, heating/cooling gradient, etc.). A reproducible cooking result, as used hereinafter, is a cooking result which deviates from a desired cooking result less than a predefined tolerance range. In other words, the desired cooking result can be described by measurable parameters such as for example, consistency, shape, color, temperature, timely availability, and/or taste of the cooked food product. If such parameters fall within the predefined tolerance range the produced food product is defined as a reproduction of the desired food product, and therefore the processing of the recipe program by the cooking apparatus leads to a reproducible cooking result.

The actual operating conditions of the cooking apparatus and/or remote kitchen appliances while processing a recipe program may deviate from the ideal conditions which are used as the bases for the recipe program. For example, a remote kitchen appliance foreseen by the recipe program may not be available at all or only a substitute appliance may be available which differs from the appliance on which the recipe is based with regards to the technical specifications (technical capabilities). For example, a remote kitchen appliance used for applying food processing steps to a component of the food product may show a different technical behavior than expected by the recipe program. For example, a heating control of an available oven does not reach the maximum temperature expected by the recipe program or the heating power is not sufficient to get to the desired temperature at the speed expected by the recipe program.

Any such deviating operating condition will typically lead to a situation that the cooking result under such deviating operating conditions substantially deviates from the desired cooking result under the conditions because subsequent steps of the recipe program are affected negatively. In other words, the achieved cooking result under the deviating operating conditions may typically fall outside the predefined tolerance range for accomplishing reproducible meals.

Therefore, it is a problem to preserve reproducibility of cooking results for a food product when executing a corresponding recipe program by the multi-function cooking apparatus involving one or more actually available remote kitchen appliances.

SUMMARY

In general, a multi-function cooking apparatus, as used hereinafter, supports at least semi-automated cooking. Semi-automated cooking support in the context of this exemplary disclosure means that at least some of the cooking steps for preparing a food product (meal) with the cooking apparatus can be automatically executed by the cooking apparatus by executing a particular recipe program for the meal. However, there may also be some cooking steps (food processing steps) that employ user interaction, such as for example, filling the cooking apparatus with particular ingredients. There may also be cooking steps that include the preparation of a food component of the food product on another multi-function cooking apparatus (e.g. with a similar functionality) or a remote kitchen appliance (e.g., a refrigerator, an oven, a heating plate, etc.). Technical parameter settings of the recipe program can automatically control corresponding cooking functions of the cooking apparatus. For example, a temperature parameter setting can control the temperature of the cooking apparatus. A rotational speed parameter setting can control the rotational speed at which one or more rotatable components of the cooking apparatus rotate.

Further technical parameter settings (e.g., a temperature parameter setting to control the temperature of the remote kitchen appliance) can affect the food processing steps on the remote kitchen appliance. For example, the further parameter settings can be sent from the cooking apparatus to the remote kitchen appliance in case an appropriate communicative coupling exists between the respective devices through which the devices can communicate based on an appropriate communication protocol. In an alternative, the cooking apparatus can provide the further parameter settings via appropriate output means (e.g., a display or audio output) to a user to provide the user with respective operating instructions to be applied to the remote kitchen appliance.

In one embodiment, a control system is configured to provide control parameters for food processing steps performed by the multi-function cooking apparatus and for food processing steps performed by one or more remote kitchen appliances. The control parameters are determined and provided by the control system to ensure the reproducibility of multiple cooking results for a food product when the food product is always prepared in accordance with the recipe program. The control system can be an integral part of the cooking apparatus itself or it may be implemented on a control device which is communicatively coupled with the cooking apparatus but operated remotely. In a remote control scenario the control system may be implemented on a mobile device, such as for example, a smartphone or a tablet computer, or it may be part of a remote cloud based server implementation. Dependent on the implementation scenario, the control system may communicate with the cooking apparatus via an internal communication bus (control system is part of the cooking apparatus), via power line communication, via a wireless local area network (WLAN), via short range communication (e.g. BLUETOOTH, ZigBee, etc.), via near field communication (NFC) technology (control system is part of a mobile device operated in the vicinity of the cooking apparatus), or via wide area networks such as the Internet or mobile communication networks (e.g., GSM, UMTS, LTE etc.; control system is part of a remote server solution).

The control system has a recipe program interface configured to access a recipe program on a data storage device. The recipe program is configured to be executed by the cooking apparatus and has recipe program instructions configured to control functions of the cooking apparatus for performing food processing steps thereon. It further includes at least one instruction for a remote food processing step performed by a particular remote kitchen appliance. The recipe program is configured so that food processing steps performed by the cooking apparatus are coordinated with food processing steps performed by the particular remote kitchen appliance when the food processing steps are performed in compliance with corresponding control parameter settings in the recipe program instructions. In other words, if the cooking apparatus and the particular remote kitchen appliance(s) perform the cooking steps according to the instructions of the recipe program, the performance of the food processing steps for various food components of the food product guarantees a reproducible cooking result for the final food product. For example, the food processing steps performed by different cooking devices may be synchronized in the sense that food processing steps on a first device which depend on the completion of food processing steps by a second device will only start upon completion of the steps by the second device.

The recipe program storage can be external to the control system or can be an integral part of it. For example, recipe programs may be provided by a remote recipe server solution or they may be stored on a mobile data carrier (e.g., USB stick, CD, DVD, etc.) which can be communicatively coupled with the control system. For example, a recipe program can include instructions with regards to types of ingredients, quantity of ingredients, a sequence for adding or mixing ingredients, control values (e.g., operating parameter settings such as, temperature, speed of the knife, direction of knife rotation, processing time. etc.) for the various food processing steps, and the duration for the various processing steps. Further, a recipe program can include internal instructions (instructions affecting internal functions of the cooking apparatus) and/or external instructions (instructions affecting one or more remote kitchen appliances).

The control system further has a validation component configured to check if the one or more remote kitchen appliances are registered with the cooking apparatus in an appliance registry. That is, the validation component can check for each recipe program instruction which includes control parameters for a remote kitchen appliance whether said remote kitchen appliance already registered with the cooking apparatus. Kitchen appliances which are registered in the appliance registry are available for performing food processing steps in cooperation with the cooking apparatus. In other words, a particular remote kitchen appliance being registered in the appliance registry can be used to prepare a food component by performing food processing steps according to external instructions of the recipe program directed to said particular remote kitchen appliance. The execution of the at least one external instruction by the cooking apparatus triggers the application of respective control parameter settings to the remote kitchen appliance. For example, the external instruction may include instructions for the remote kitchen appliance to heat a food component at 80° C. for 5 minutes. In one embodiment, the control parameters are directly communicated to the remote kitchen appliance and adjust the control parameter setting of the remote kitchen appliance accordingly. In an alternative embodiment, the control parameters are communicated to a human via appropriate I/O means (e.g., display, audio, etc.) user and instruct the user to apply the settings to the remote kitchen appliance.

In one embodiment, the control system may include a registration component which can register remote kitchen appliances for the cooking apparatus in the appliance registry. For example, such registration may occur via receiving registration data for the particular remote kitchen appliance via a user interface of the cooking apparatus and storing the registration data in the appliance registry. Alternatively, the registration component may discover the particular remote kitchen appliance via an exposed service interface of the particular remote kitchen appliance. For example, the exposed service interface of the particular appliance may provide a service description with the technical capabilities of the appliance and may further provide an interface description including the control parameters which are needed to perform the respective food processing steps. The registration data received from the exposed service interface by the registration component for the particular remote kitchen appliance is then stored in the appliance registry. The registration data includes at least an identifier of the respective remote kitchen appliance. An entry in the appliance registry indicates to the control system that the corresponding remote kitchen appliance is actually available for food processing. Optionally, further data may be stored with the registration data of registered remote kitchen appliances. For example, technical specifications including a type, name, IP address, technical functions, technical control parameters, etc. can be stored for each registered appliance in a technical specifications database. The technical specifications database can be part of the appliance registry. Alliance registry and technical specifications database can be stored in a memory portion of the control system or may be stored on any appropriate external storage device which can be accessed by the control system.

The validation component is further configured to check if technical specifications of the registered remote kitchen appliances comply with control parameters in respective recipe program instructions. For example, if a control parameter includes a temperature setting of 200° C. for a remote kitchen appliance but the appliance has a technical specification indicating a maximum temperature of 180° C., the validation component would detect non-compliance between the respective recipe program instruction and the available remote kitchen appliance. In one embodiment, the validation component may be configured to check if the technical specifications of the registered remote kitchen appliances comply with control parameters in respective recipe program instructions by retrieving the technical specifications of the one or more remote kitchen appliances, and by validating if the technical specifications correspond, within predefined tolerance ranges, to respective predefined technical specifications on which the recipe program is based.

The control system further has a recipe program adjustment component configured to adjust the recipe program if a particular technical specification of at least one remote kitchen appliance does not comply with at least one particular control parameter in at least one particular recipe program instruction. That is, if the technical specification of a remote kitchen appliance indicates that the technical capability of the appliance does not provide for performing the food processing steps according to the recipe instructions, the recipe program is adjusted in such a way that a reproducible cooking result can still be reached in accordance with the technical specification of the kitchen appliance. Thereby, recipe instructions affected by the particular control parameter are adjusted in accordance with the particular technical specification of the at least one remote kitchen appliance to preserve synchronization of the cooking apparatus with the one or more remote kitchen appliances during execution of the adjusted recipe program. Recipe instructions affected by the particular control parameter are all recipe instructions which have a direct or indirect dependence on the result of the food processing step which is performed by the remote kitchen appliance in response to the recipe instruction including said at least one particular control parameter.

In one embodiment, the control system may further include an execution trigger component configured to indicate inability to execute the recipe program if at least one of the one or more remote kitchen appliances is not registered. That is, in case the validation component recognizes that the recipe program to be executed includes one or more (external) instructions which are targeting food processing steps to be performed by a remote kitchen appliance not being registered in the appliance registry the validation component determines that the recipe program cannot be successfully executed because the not-registered kitchen appliance is not available. This prevents a successful execution of the recipe program in that a reproducible cooking result for the food product cannot be achieved because the particular food processing steps according to the respective (external) instruction(s) cannot be performed. As a consequence, the validation component notifies the execution trigger component to send a notification to the recipe execution engine of the cooking apparatus that the currently selected recipe program cannot be executed. Optionally, the notification may also be sent to the IO means of the cooking apparatus to notify the user accordingly.

The execution trigger component may further be configured to trigger execution of an original or an adjusted recipe program by the cooking apparatus to initiate the corresponding food processing steps. In case the technical specifications of the one or more remote kitchen appliances comply with the control parameters in the recipe program instructions the validation component may send a notification to the execution trigger that the cooking apparatus can be notified to start program execution of the validated recipe program.

In case of non-compliance and in case the recipe program is adjusted in accordance with the technical specification of the respective remote kitchen appliance the validation component may notify the execution trigger to send a notification to the execution trigger to start program execution of the adjusted recipe program which is provided to the recipe program storage of the cooking apparatus via the recipe program interface. The recipe execution engine can then execute the respective recipe program instructions and involve the remote kitchen appliance according to the external instructions. Thereby, the adjustment may be performed in a way to re-synchronize the cooking apparatus with the particular remote kitchen appliance. For example, the adjustment component can reschedule the execution of internal program instructions which depend on the completion of the remote food processing step by the remote kitchen appliance in response to the at least one external program instruction in accordance with technical specification. That is, no matter whether the adjusted remote processing step takes longer or shorter than anticipated in the original external program instructions, the start of any dependent food processing step by the cooking apparatus or by other remote kitchen appliances is synchronized with the actual termination of the remote food processing step on the respective remote kitchen appliance.

Further embodiments of the present disclosure relate to a multi-function cooking apparatus including a control system as previously disclosed, a method to control food processing steps performed by a cooking apparatus and by one or more remote kitchen appliances, and a computer program product having computer program instructions which when being loaded into a memory of the control system and being executed by at least one processor of the control system cause the at least one processor to execute the steps of said food processing control method.

The method includes the steps: providing, to the cooking apparatus, machine readable program instructions of a recipe program for preparing a food product wherein the recipe program is configured to be executed by the cooking apparatus and to synchronize food processing steps performed by the cooking apparatus with food processing steps performed by the one or more remote kitchen appliances; by the validation component, if the one or more remote kitchen appliances are registered with the cooking apparatus; if at least one of the one or more remote kitchen appliances is not registered, indicating inability to execute the recipe program; if the one or more remote kitchen appliances are registered, checking, by the validation component, if technical specifications of the one or more remote kitchen appliances comply with control parameters in respective recipe program instructions; if the technical specifications of the one or more remote kitchen appliances comply with the control parameters in the recipe program instructions, triggering execution of the recipe program by the cooking apparatus to initiate the corresponding food processing steps; and if the technical specification of at least one remote kitchen appliance does not comply with the control parameters in the recipe program instructions, adjusting the recipe program, by an adjustment component, by adjusting affected control parameters in the recipe program according to the technical specification of the at least one remote kitchen appliance, and triggering execution of the adjusted recipe program by the cooking apparatus.

In a further embodiment, the computer program instructions may be stored on a computer readable medium forming said computer program product.

Further aspects of the present disclosure will be realized and attained by means of the elements and combinations particularly depicted in the appended claims. It is to be understood that both the foregoing general description and the following detailed description are exemplary and explanatory only, and are not restrictive of the present disclosure as described.

BRIEF DESCRIPTION OF THE DRAWINGS

FIGS. 6A-6B show a simplified example of a part of a recipe program and its adjustment according to one embodiment of the present disclosure.

FIG. 7 is a diagram that shows an example of a generic computer device and a generic mobile computer device, which may be used in embodiments of the present disclosure.

DETAILED DESCRIPTION

Figure 1A:
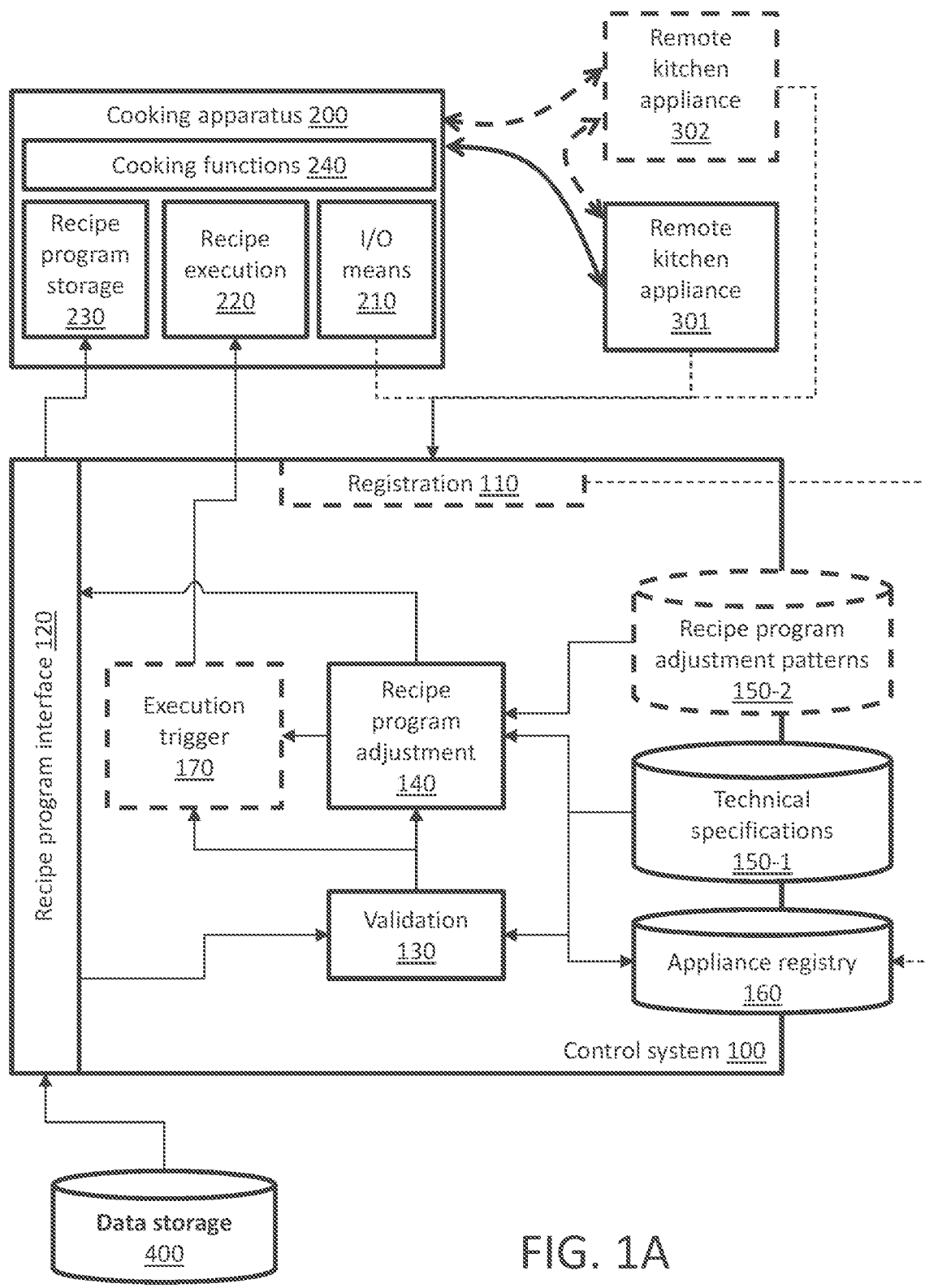
FIGS. 1A-1B illustrate a simplified component diagram of a control system according to one embodiment of the present disclosure for controlling food processing steps performed by a multi-function cooking apparatus.
Figure 2:
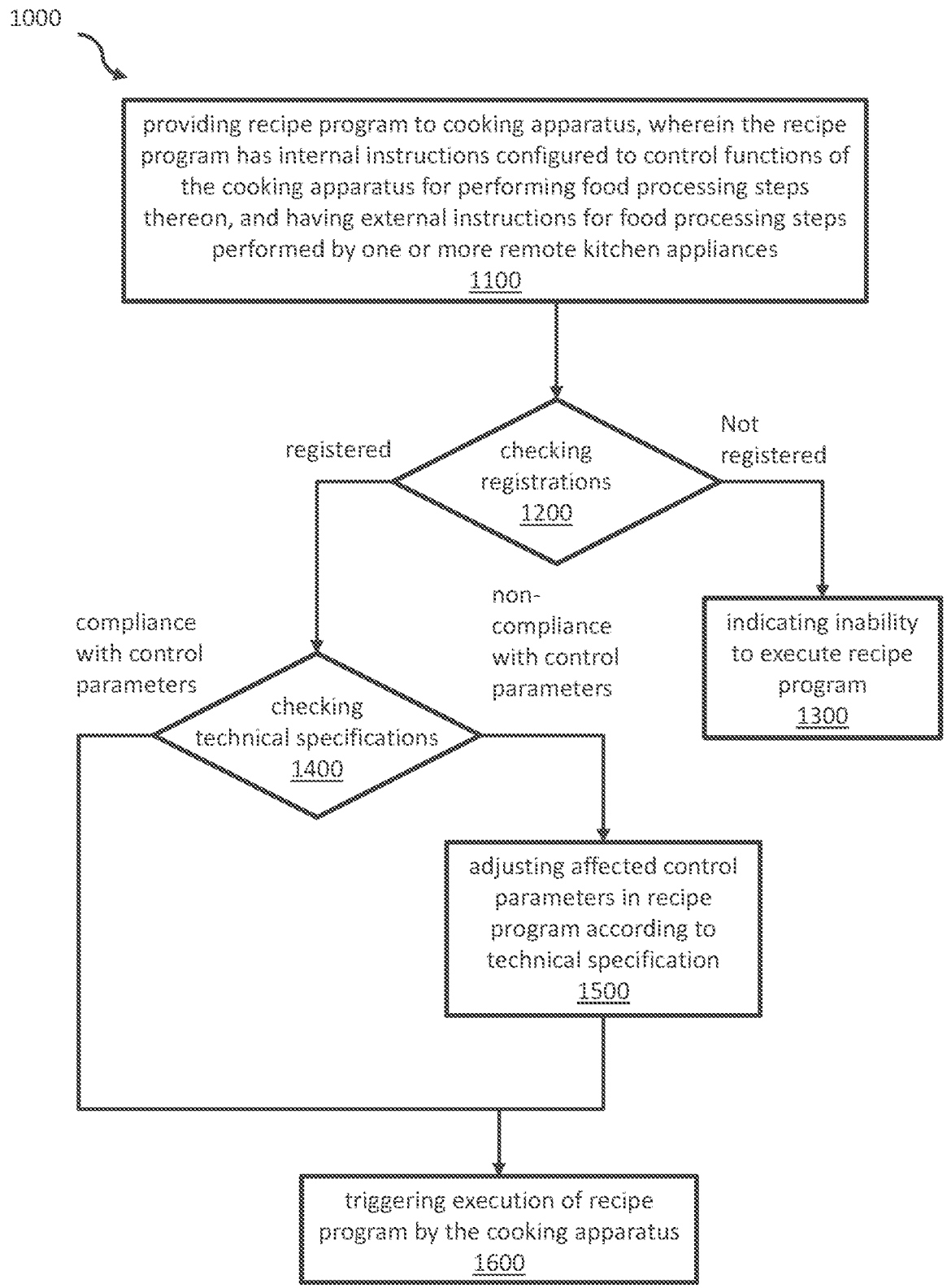
FIG. 2 is a simplified flow chart of a method to control food processing steps performed by a cooking apparatus and by one or more remote kitchen appliances for preparing a food product according to one embodiment of the present disclosure.
Figure 3A:
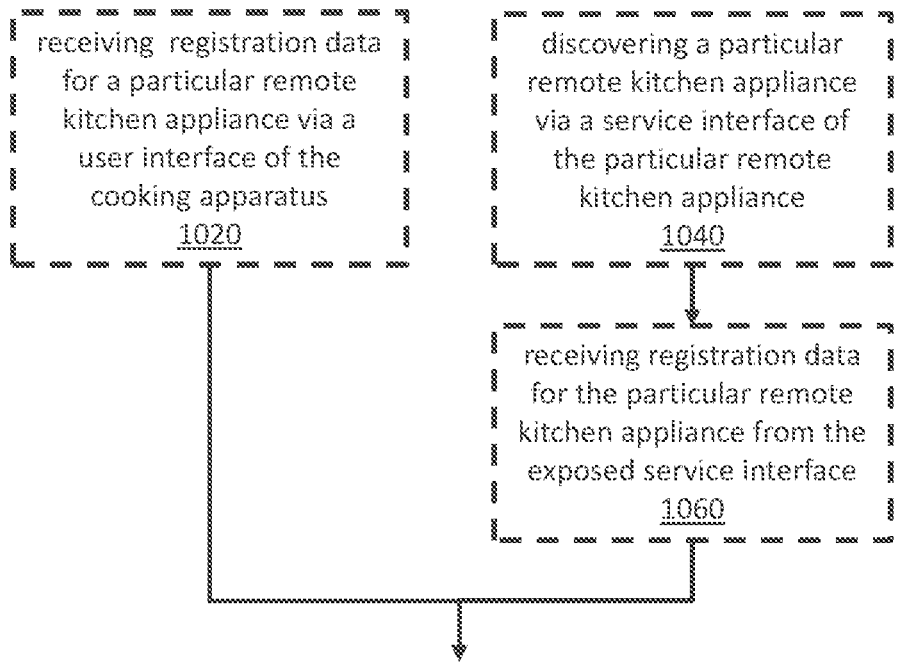
FIG. 3A is a simplified flow chart illustrating sub-steps of the control method for registering remote kitchen appliances with the cooking apparatus.
Figure 3B:
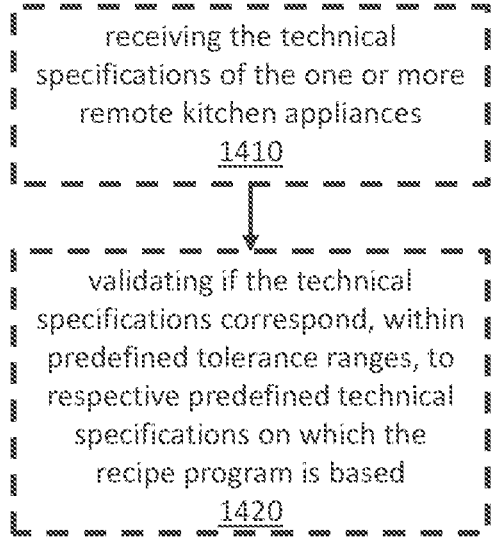
FIG. 3B is a simplified flow chart illustrating sub-steps of checking technical specifications according to one embodiment of the present disclosure.

FIG. 1A is a simplified component diagram of a control system 100 for controlling food processing steps performed by a multi-function cooking apparatus 200 and food processing steps performed by one or more remote kitchen appliances (RKA) 301, 302 for preparing a food product according to one embodiment of the present disclosure. FIG. 1A will be described in the context of the simplified flow-chart of FIG. 2 for the method 1000 being executed by the control system 100. The following description makes use of reference numbers referring to FIG. 1A, FIG. 1B, as well as to FIGS. 2, 3, 4.

Figure 1B:
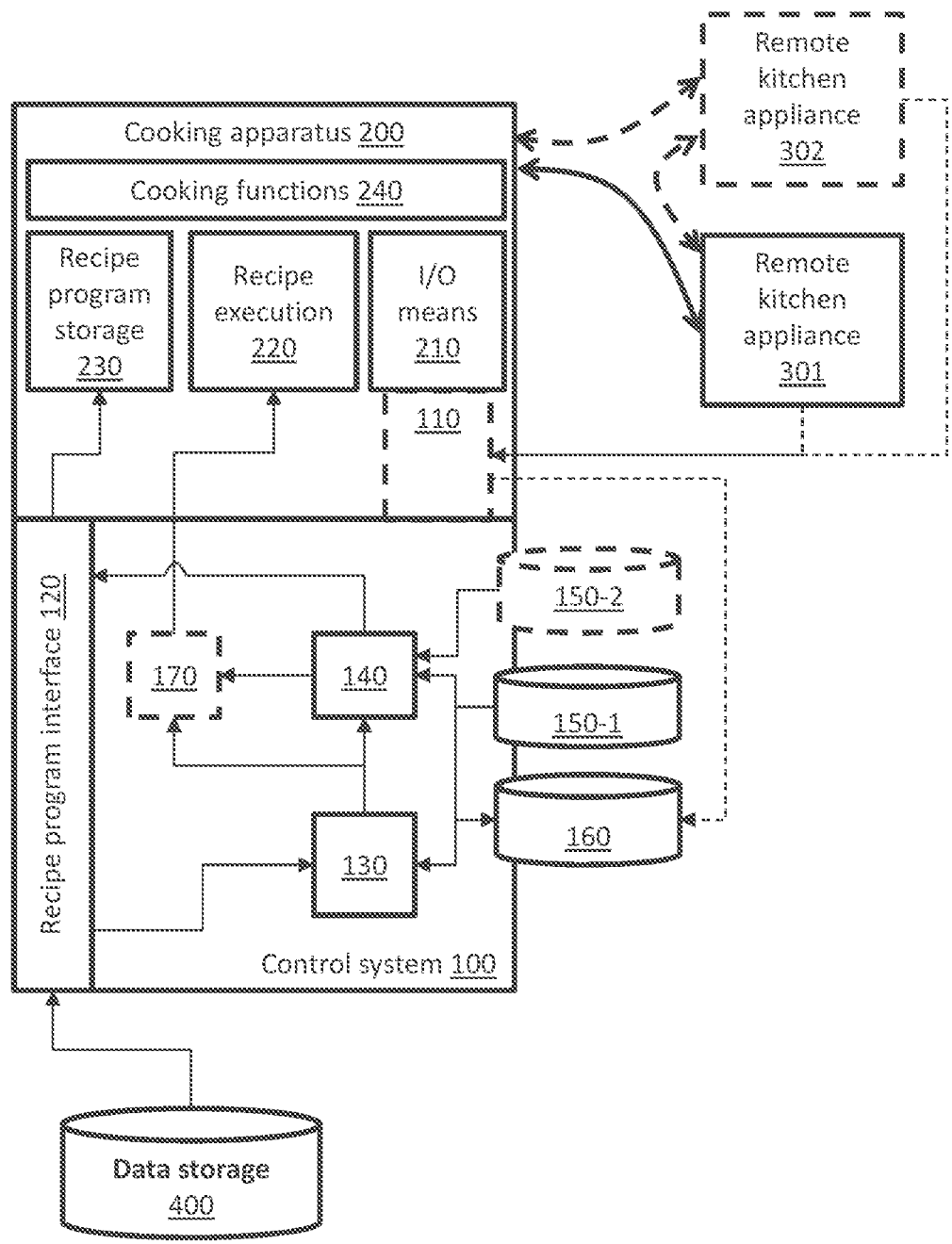

The control system 100 is communicatively coupled with the cooking apparatus 200 via recipe program interface (RPI) 120. The interface can have any appropriate interface type supporting the exchange of data between the cooking apparatus 200 and the control system 100. For example, a serial interface (e.g., a USB interface) or a parallel interface (e.g., an IEEE 1284 interface), or an internal communication bus may be used. The control system 100 can be an integrated component of the cooking apparatus 200 or it can be implemented remotely (e.g., on a mobile device like a smartphone or tablet PC, or on a remote server which may communicate with the cooking apparatus over the Internet or mobile communication standards or wired communication standards or wireless communication standards). FIG. 1B illustrates an embodiment, where the control system 100 is implemented as an integrated component of the cooking apparatus. In the embodiment of FIG. 1B, the optional registration component 110 can be implemented as an extension of the I/O means 210 of the cooking apparatus 200. FIG. 1A illustrates the control system 100 implemented on a remote device, such as a smartphone, tablet computer or even on a remote server. Advantageously, the remote device has a communicative coupling with the cooking apparatus so that the control system can communicate with the cooking apparatus in real time. The following description relates to the embodiments of FIG. 1A and FIG. 1B.

Via the recipe program interface 120 the control system 100 is further communicatively coupled with the data storage device 400 storing recipe programs for the cooking apparatus 200. The data storage device 400 can be any device with a memory for storing data in electronic format (e.g., a memory stick/card, a memory disk on a remote server, etc.). In some embodiments, the data storage device may be physically connected with the cooking apparatus (e.g., via a USB plug). In other embodiments, the data storage device may be connected via an appropriate network connection (e.g., LAN, WAN or WLAN connection). The data storage device may have a database or a file system to store recipe programs which are intended to be executed by the cooking apparatus. A recipe program example is disclosed in the context of FIGS. 6A, 6B. A recipe program is a digital recipe which includes a plurality of control instructions (referred to as recipe program instructions or program instructions hereinafter) with technical parameter settings to control food processing steps of functions performed by the cooking apparatus 200 when the recipe program is executed by a recipe execution component 220 of the cooking apparatus 220. Further, the recipe program may include program instructions with control parameters to be applied to one or more RKAs (external instructions) used for preparing the food product.

For example, the control system 100 can access a particular recipe program for preparing a particular food product via the recipe program interface 120. The particular recipe program may be stored on the data storage device 400 and is configured to be executed by the recipe execution engine 220 of the cooking apparatus 200. The particular recipe program is configured to provide a reproducible cooking result for the food product when the recipe execution is completed. For example, in case food components of the food product are prepared by respective RKAs the recipe program may include timing instructions which ensure that subsequent food processing steps using the food component as an input are started once the processing of the food component terminates. In other words, the particular recipe program is configured to synchronize food processing steps performed by the cooking apparatus with food processing steps performed by the one or more RKAs 301, 302.

For example, in case of a communicative coupling of the cooking apparatus with a particular remote kitchen appliance the cooking apparatus can provide control parameters of the external instruction to an IP address associated with the particular remote kitchen appliance. For example, the cooking apparatus may directly communicate with the particular remote kitchen appliance, e.g., via a BLUETOOTH or NFC connection (direct coupling), or, for example, it may communicate with the kitchen appliance via a router (e.g., WLAN router) or a repeater of a wireless network (indirect coupling). If there is no communicative coupling, the external instruction may be a display instruction to display the control parameters to the user of the cooking apparatus and instructing the user to apply the respective parameter settings to the remote kitchen appliance. The particular recipe program may be configured to provide a synchronized flow of food processing steps performed by the cooking apparatus and one or more remote kitchen appliances involved in the preparation of the food product. In other words, a food product which comprises multiple food components is prepared by a sequence of food processing steps for the various food components. Some of the food processing steps may be performed sequentially on one of the cooking devices. Some of the food processing steps may be performed in parallel by the cooking apparatus and, for example, the RKA 301. For example, the RKA 301 may perform food processing steps to prepare a food component which is needed as input for the further processing of the food product by the cooking apparatus (or vice versa). To provide a high quality reproducible cooking result for the food product it can be important that the food component which is needed as input for the further processing is available at the right time to enable a processing of the food product without inappropriate delays. An inappropriate delay is a delay that may cause a status change of a food component (e.g., a temperature change) which is disadvantageous for subsequent processing steps. Therefore, it is advantageous when the cooking device (which is used for the further processing of the food component) is in the correct technical state to continue with the processing of the food component according to the recipe instructions without such delays. That is, the recipe program is configured to avoid such delays if the food processing steps are all performed according to control parameters of the respective recipe instructions. In this case the cooking devices are synchronized. If however a food processing step takes longer or shorter than expected according to the control parameter settings the cooking devices will get out of sync and the reproducibility of the cooking result for the food product is at risk. In this case the cooking devices (cooking apparatus, one or more remote kitchen appliances) may be re-synchronized.

The cooking apparatus 200 has a memory component 230 to store the recipe program instructions of the particular recipe program which is provided 1100 by the RPI 120 of the control system. The instructions are to be processed by the recipe execution component 220. For example, the recipe execution component 220 can include an interpreter for interpreting the recipe instructions. The basic cooking functions are then performed by respective hardware components 240 (e.g., motor, heating means, scales, etc.) of the cooking apparatus under the control of the execution component 220. Basic cooking functions using different hardware may be performed in parallel (e.g., heating and stirring). That is, the execution component 220 transforms the program instructions into control signals applied to the hardware components 240. A person skilled in the art can build a corresponding interpreter for this purpose. Persons of skill in the art can implement the mapping of program instructions to hardware control signals, for example, by using instructions in so-called machine-code that control the hardware components directly. In case the cooking apparatus receives adjusted recipe program instructions from the control system 100, the adjusted recipe program instructions may replace the corresponding original program instructions stored in the memory component 230. Thereby, internal instructions relate to recipe instructions which are controlling food processing steps performed by the cooking apparatus 200 itself. External instructions relate to recipe instructions which affect food processing steps performed by the remote kitchen appliance 301. Both types of instructions can include control parameter settings for the respective device. For example, in case the particular recipe program includes a recipe for a food product including multiple food components (e.g., steak, fried potatoes and spicy pepper sauce) different parts of the recipe program relate to the corresponding food components of the food product. For example, the fried potatoes and the spicy pepper sauce may be processed by the cooking apparatus 200 whereas the steak may be remotely processed in a pan on a remote hotplate 301. In this case the recipe program may include internal instructions configured to control respective cooking functions 240 (e.g., heating, stirring, etc.) of the cooking apparatus 200 for processing the fried potatoes and the spicy sauce. It may further include external instructions including control parameters (e.g., heating temperature, heating time) for the food processing of the steak by the remote hotplate.

The recipe program interface 120 of the control system can access and retrieve recipe programs from the data storage 400 and forward the retrieved recipe programs directly to the cooking apparatus for execution 1010 if no recipe adjustments are performed. However, the control system 200 is configured to adjust recipes instructions under certain conditions before they are forwarded to the cooking apparatus.

As explained earlier, the recipe programs retrieved from the recipe program storage 400 are designed to provide optimal and reproducible cooking results for respective meals (food products) when the cooking apparatus and the respective remote kitchen appliances are operated under predefined operating conditions while executing the respective recipe programs. That is, each a recipe program which includes external and internal instructions is based on technical capabilities of the involved cooking devices (e.g., cooking apparatus 200 and RKAs 301,302) which can be described by technical specifications. In other words, for a given recipe program there are underlying assumptions about the availability of cooking devices with the expected technical capabilities. However, in the real world, a user of the cooking apparatus may not always be in possession of all RKAs which used for preparing the food product under control of the recipe program. It may occur that a particular RKA is completely missing or that an available RKA has a technical specification which deviates from the respective technical specification on which the recipe program is based.

To preserve the reproducibility of cooking results, in such situations the control system 100 further has a validation component (VC) 130 and a recipe program adjustment component (RPA) 140. The VC 130 is configured to check 1200 if the one or more RKAs which are used by the to-be-executed recipe program are registered with the cooking apparatus 200 in an appliance registry 160.

In one embodiment, the registration of RKAs with the cooking apparatus in the registry appliance can be performed via a registration component 110 of the control system 200. For example, the registration component 110 may receive registration data for the RKAs 301, 302 via an appropriate user interface 210 of the cooking apparatus 200 and to store the registration data in the appliance registry 160. The registration of RKAs can be performed independently of the execution of a recipe program. For example, whenever the user acquires a new RKA, the user may register the RKA as an available cooking device for the future execution of recipe programs. That is, the RC 110 receives 1010 the corresponding registration data via the user interface of the cooking apparatus. For example, if the user gets new poultry scissors this tool may enable the cooking apparatus to successfully execute recipe programs where poultry is a food component. The user can now register the poultry scissors as an RKA being available for the cooking apparatus. RKA registration may occur through the IO/means 210 of the cooking apparatus or via a registration interface 110 that can be implemented in the control system also in cases where the control system is not an integrated part of the cooking apparatus. For example, the user may enter the name of the tool (e.g., poultry scissors) or a corresponding identifier (ID) via the I/O means 210 (e.g., via a touch screen or a keyboard) of the cooking apparatus. Some RKAs may be equipped with a unique code (e.g., a bar code, QR code or RFID code). In this case the user may use a respective code reader to scan the code. For example, a smartphone or tablet computer which is communicatively coupled with the registration component 110 may be used for reading the RKA ID via the unique code. In some embodiments, the control system 100 may also be implemented on the smartphone or tablet computer. Finally, the appliance registry 160 stores this registration data. For example, a simple table data structure may be used to store value pairs with the ID of the cooking apparatus and the ID of the RKA. Other data formats, such as XML files, may be used as well to store the registration data.

Alternatively, registration component 110 may be configured for automated registration of RKAs in case this is supported by the respective RKA. For example, with the advent of the Internet of Things many RKAs (e.g., oven, refrigerator, microwave, etc.) are equipped with a dedicated IP address. Thus, an electronic communication between the RKA and the cooking apparatus 200 or the RC 110 can take place based on an appropriate communication protocol. Such RKAs may be able to expose their technical capabilities in the form of service descriptions via service interfaces which are exposed to other communication devices. That is, the cooking apparatus or the RC 110 can discover 1040 a particular remote kitchen appliance 301 via an exposed service interface of the particular remote kitchen appliance 301. In one example, the discovery can be based on simply recognizing that a new RKA providing a particular service is now available. In another example, the discovery 1040 may be triggered by a particular recipe program which is validated by the control program. If the recipe program includes the use of a not-yet-registered RKA capability the RC 110 may perform a discovery 1040 by matching the technical capability with the exposed service descriptions of available RKAs. If there is a match with one of the available RKAs the RC 110 can receive 1060 the corresponding registration data for the identified RKA from the exposed service interface and store the registration data in the appliance registry 160. It may occur that a multi-functional RKA can provide multiple technical capabilities from which only one has been registered so far. The automated discovery 1040 may recognize that the RKA can also be used for different purposes and generate additional registration data entries for the same RKA. For example, a multifunction microwave may also support other functions, such as baking or steaming. Such a RKA may be registered in the appliance registry with a separated data entry for each supported cooking function with the corresponding technical capabilities. It may also be advantageous when a further multi-functional cooking apparatus is used as an RKA to reflect all the supported functions in the appliance registry. For implementing the automated discovery option the skilled person can make use of service oriented architectures (SOA).

In one embodiment, the control system further includes an execution trigger component 170. For example, if, during check 1200, VC 130 determines that at least one of the one or more remote kitchen appliances used by the to-be-executed recipe program is not registered with the cooking apparatus 200 in the appliance registry 160 it can instruct the execution trigger component 170 to indicate 1300 to the recipe execution engine 220 the inability to execute the recipe program. As a consequence, the control system prevents the cooking apparatus to start the execution of a recipe program which could not be executed in a way to ensure a reproducible cooking result for the food product because at least the food processing steps directed to the unregistered (not available) RKA could not be performed. Upon receipt of the inability notification the cooking apparatus may prompt the user accordingly via the I/O means 210. In one embodiment, the cooking apparatus may prompt the user with a request to register the missing RKA in order to enable the execution of the recipe program. In case the user responds to the request by registering the missing RKA the VC 130 again performs the validation of the recipe program with regards to the registered RKAs and, in case all capable RKAs are registered, can notify the execution trigger 170 to initiate the execution of the recipe program by the recipe execution engine 220.

The use of the execution trigger 170 is optional and can be advantageous in embodiments where the recipe program is already stored in the recipe program storage 230 and the buffer (not shown) for the recipe validation used by the control system is located in the control system 100. Alternatively, the control system may not forward the recipe program to the cooking apparatus at all before the recipe program is fully validated or adjusted. In this alternative embodiment, the recipe execution may be triggered by the receipt of the recipe program in recipe program storage 230. In this case, the execution trigger 170 is not necessary.

Even when the to-be-executed recipe program refers to an RKA with a registered function the technical capability of the registered RKA may deviate from the technical capability which is assumed for the control parameters of the respective external instructions. For example, in case an external instruction refers to an oven for performing a baking step at 220° C. for 15 min and the appliance registry has an entry for a multi-function microwave 301 with a baking function then, in principle, the recipe program can be executed because a respective RKA (multi-function microwave 301) is registered and available to perform the baking step. Therefore, an inability notification will not be sent. However, the technical specification of the multi-function microwave 301 does not comply with the control parameters in the respective recipe program instructions. Nevertheless, according to embodiments of the present disclosure, the recipe program may be executed and still deliver a reproducible cooking result.

In general, the validation component 130 is further configured to check 1400 if technical specifications 150-1 of registered remote kitchen appliances comply with control parameters in respective recipe program instructions. Such technical specifications can be stored in a technical specifications database 150-1 which may also be an integral part of the appliance registry 160. It is not important where such databases are stored. They can be stored in memory portions of the control system 100 or on at least one remote storage location which is accessible by the control system. The technical specifications include technical details regarding the technical capabilities of the RKA for respective cooking functions.

In the above example, the microwave baking function may be associated with a maximum temperature setting of 200° C. The original microwave function may be associated with a maximum power setting of 1200 W with six power modes corresponding to 120 W, 360 W, 450, 600 W, 900 W, and 1200 W. In this example, the multi-function microwave RKA 301 has to registration data entries in the appliance registry 160: baking and microwave. RKA function "baking" is associated with the technical specification of a maximum temperature setting of 200° C. RKA function "microwave" is associated with the technical specification of the six power modes. Technical specifications can include more detailed and more complex information, such as for example, a heating curve including the information how long it takes to reach a given temperature value (e.g., the maximum temperature value 200° C.) when operating the baking function. An example for such a technical specification is the heating curve 150-1a illustrated in FIG. 4.

In the above example, the VC 130 can now retrieve 1410 the technical specification of the baking function of microwave 301 from the technical specifications database 150-1 and determine that the technical specification of the baking function of microwave 301 (maximum temperature value 200° C.) does not comply with the corresponding control parameter setting in the recipe program instruction for the baking step at a remote baking device (220° C. for 15 min).

Figures 4, 5:
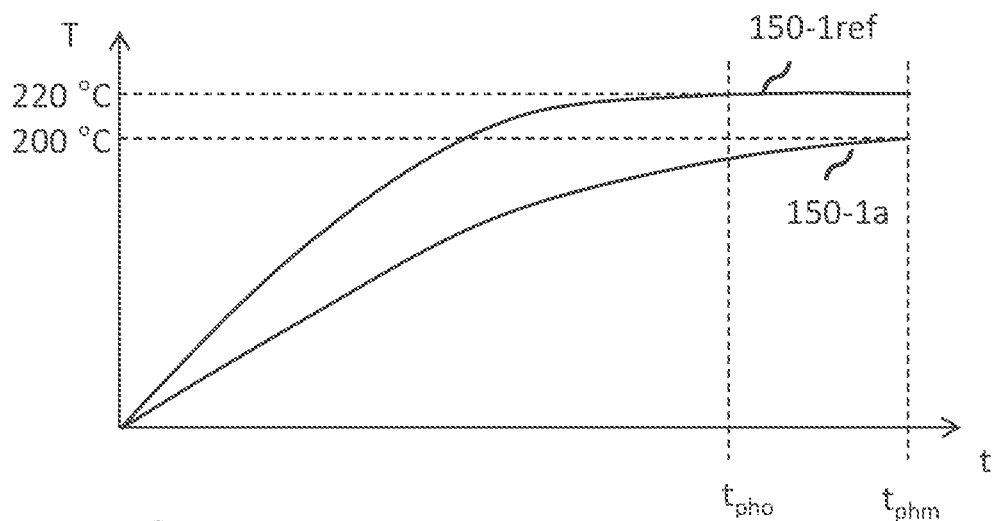
FIG. 4 illustrates a simplified example of technical specifications of a registered remote kitchen appliance and a corresponding reference appliance according to one embodiment of the present disclosure.
FIG. 5 illustrates an example embodiment of an appliance registry.

For example, the VC 130 can check (validate) 1420 if the technical specification corresponds, within predefined tolerance ranges, to a respective predefined technical specification on which the recipe program is based. In this embodiment, a specific RKA (e.g., a specific oven specified by its type) is indicated in the respective external instructions of the recipe program and the technical specifications data base 150-1 stores the technical specification for the specific RKA indicated in the recipe program. For example, the technical specification 150-1ref as illustrated in FIG. 4, reflects the heating curve of the oven as foreseen by the to-be-executed recipe program (reference curve) whereas the technical specification 150-1a illustrates the actually available technical capability of the microwave 301. The validation component may apply a tolerance range of +/−5° C. to the pre-defined technical specification 150-1ref and compare it with the technical specification 150-1a. In the example, the technical specification 150-1a of the microwave 301 does not fall within the tolerance range and the validation component will determine non-compliance of the technical specification with the control parameters when based on the result of check 1400.

As a consequence, VC 130 invokes RPA 140 to adjust 1500 the recipe program in such a way that the baking step, when performed by the baking function of the microwave 301, leads to a reproducible cooking result for the respective food component and that food processing steps which depend on the baking step are rescheduled accordingly. The RPA 140 can include adjustment rules which allow computation of adjusted control parameters based on respective formulas. In the above example, the maximum baking temperature of the microwave 301 according to the corresponding technical specification is 200° C. Therefore, the control parameter setting may then be adjusted to 200° C. The RPA 140 can compute the baking time which leads to a reproducible baking result at 20° C. less than anticipated in the time control parameter of 15 minutes.

In a basic embodiment, the RPA 140 may use a formula like $t_a = t*(1+\Delta T/T)$ where $t_a$ is the adjusted time control parameter, t is the original time control parameter of the external instruction, $\Delta T$ is the difference between the expected temperature (220° C.) in the external instruction and the achievable temperature (200° C.) according to the technical specification, and T is the expected temperature (220° C.) in the external instruction. As a result $t_a$ is computed as 16:22 minutes. The RPA 140 can then modify the external instruction for the baking step to reflect the technical specification of the multi-function microwave 301 by replacing the control parameters (220° C., 15 min) with the adjusted control parameters (20° C., 16:22 min) and provide the adjusted recipe to the recipe program storage 230 for triggering 1600 execution by the engine 220. Subsequent program instructions may also be adjusted to take into account that the baking food component will be available about 1½ minute later than originally expected to preserve synchronization of the cooking apparatus 200 with the one or more remote kitchen appliances 301, 302 during execution of the adjusted recipe program. In case that the baking temperature (e.g., 230° C.) of the microwave would exceed the original control parameter setting the same formula would lead to a reduction of the baking time because $\Delta T$ becomes negative: $t_a$ is computed as 14:19 minutes. In the computation rule example temperature values are always defined in relation to 0° C.

In a more complex embodiment, the RPA 140 may use predefined recipe program adjustment patterns (RPAP) 150-2 to derive adjusted control parameter settings based on the technical specifications. For example, in cases where the computation of adjusted control parameters cannot be computed by a simple formula because there may be non-linear dependencies between control parameters, such adjustment patterns can reflect such dependencies. The adjustment patterns may reflect empirical measurement results showing the dependencies of control parameters. The RPA 140 can then use such RPAPs 150-2 like lookup tables to find valid combinations of adjusted control parameters which provide comparable cooking results as with the original control parameters. The adjustment of recipe instructions can also include the insertion of additional recipe instructions into the recipe program.

If the technical specification of the microwave 301 is compliant with the control parameter setting in the external instruction there is no need for recipe adjustment. The recipe program can be directly forwarded to the cooking apparatus 200 to trigger 1600 execution of the recipe program.

A food product may include multiple food components to be processed by more than one remote kitchen appliance. For example, a second remote kitchen appliance RKA 302 (e.g., a refrigerator) may be used for cooling cream to a temperature which is used to produce whipped cream by the cooking apparatus for a desert component of the food product. In this case, the recipe program has further external instructions affecting the remote food processing steps for cooling performed by the further remote kitchen appliance RKA 302. The RPA 140 is configured to also adjust the further external instructions related to the RKA 302 to re-synchronize the food processing steps of the cooking apparatus 200 and of the RKA 302 with the adjusted food processing steps of RKA 301.

FIG. 4 illustrates simplified examples of technical specifications of non-linear temperature-over-time (T, t) curves 150-1a, 150-1ref as they may be stored in the technical specifications database 150-1. Such curves can be used by the validation component of the control system to check the compliance of the technical capabilities of registered RKAs with the control parameter settings of a to-be-executed recipe program. For example, the curve 150-1a may reflect the characteristic temperature behavior of the baking function of the microwave in the previously described example. 150-1ref may reflect the characteristic temperature behavior of a reference oven on which the original recipe program is based.

FIG. 5 illustrates a simplified example of the appliance registry 160. In the example, three data sets are registered for the cooking apparatus 200. Thereby, RKA 301 is registered twice for two different functions: "baking" and "microwave." The last column includes a link to the respective technical specifications. Alternatively, technical specification values may be included in the appliance registry. For example, columns for the maximum temperature or the power modes of the respective RKA could be included. The second RKA 302 (e.g., refrigerator) is registered for the function cooling. Any other appropriate format to store such data records may be used for the implementation of the appliance registry. The validation component can check the appliance registry first and then retrieve the respective technical specification from the technical specification database via the technical specification ID.

FIG. 6A shows a simplified example of a part of a recipe program 601. The recipe program 601 includes code instructions to prepare a food product "Lasagne Bolognese followed by strawberries with whipped cream." Some of the instruction (steps 7, 15) are internal instruction controlling cooking functions of the multi-functional cooking apparatus. Some of the instructions (steps 8 to 11) are external instructions where the corresponding food processing steps are to be performed by remote kitchen appliances (baking, oven dish, cooling). The content of the ingredient and text columns may be communicated to the user of the cooking apparatus via the I/O means of the cooking apparatus (e.g., by displaying the information or by audio output).

The food product includes at least the food components: Lasagne filling, raw Lasagne, cooked Lasagne, cooled cream, and whipped cream. In the example, the food processing steps 7, 15 for the Lasagne filling and the whipped cream are performed by the cooking apparatus. The food processing step 9 for the raw Lasagne is performed by using the RKA oven dish. The food processing steps 8, 10 for the cooked Lasagne are performed by an RKA supporting a baking function. The food processing step 11 for the cooled cream is performed by an RKA supporting a cooling function. There may be much more food processing steps involved to prepare the entire food product which is illustrated by the rows with dotted entries. However, for explaining the inventive features the illustrated steps are convenient.

Upon receipt of the recipe program 601 by the control system the validation component checks whether the RKAs used by the recipe program are registered. For the example it is assumed that a multi-function microwave is registered which provides a baking functions with a maximum temperature of 200° C. and has a technical specification corresponding to the specification 150-1a in FIG. 4. It is further assumed that an RKA oven dish is registered with the cooking apparatus and also a refrigerator providing a cooling function at a constant cooling temperature of 7° C. As a consequence the validation component determines that the existing kitchen equipment based on the registered RKAs is appropriate to execute the recipe program and arrive at a reproducible cooking result for the food product.

However, the second check of the validation component with regards to the compliance of the control parameters in the recipe instructions with the technical specification will determine a non-compliance of the control parameters used in the external instructions 8, 10 with the technical specification of the microwave baking function. The control parameters in the external instructions 9 and 11 are compliant with regards to the technical specification of the oven dish and the cooling function of the refrigerator. As a consequence, the validation component invokes the recipe adjustment component to compensate the recipe program with regards to the deviating technical specification of the microwave baking function.

FIG. 6B shows a modified recipe program 602 with adjusted recipe instructions in steps 8, 10 and 11. The recipe adjustment is caused by a deviation of the food processing steps performed by the microwave baking function from the control parameter settings in the original recipe 601. As the microwave according to its technical specification is not configured to reach a temperature of 220° C. as foreseen in the original recipe 601, the control parameters for the temperature setting as well as the corresponding baking times are adjusted according to the actual technical capability of the microwave in such a way that still a reproducible cooking result is achieved with the modified recipe program 602.

In the example, adjustment formula $t_a = t*(1+\Delta T/T)$ explained in FIG. 1A is applied by the recipe adjustment component for the adjustment of step 10 whereas the technical specifications of FIG. 4 are used for the adjustment of the pre-heating step 8. Regarding step 8, it is assumed that the technical specification 150-1ref is available in the technical specifications database and is associated with the generic RKA baking used in the external instructions of the original recipe program 601 as a reference curve. The validation component recognizes that there is a deviation between 150-1a (microwave) and 150-1ref (generic baking RKA) which exceeds a predefined tolerance range. The recipe adjustment component can then determine corrected/adjusted control parameters based on the two technical specifications. The pre-heating interval used by the generic oven RKA to reach 220° C. is too. The pre-heating interval used by the available microwave to reach its maximum temperature of 200° C. is tom. The recipe adjustment component derives that the pre-heating phase is about 33% longer for the microwave baking function than for the generic oven. As a result, in the pre-heating step 8 of the adjusted recipe program the control parameter for the temperature control parameter is set to the actually achievable maximum temperature of 200° C. while at the same time the control parameter for the preheating time is increased by 33% to 8 min to make sure that the microwave is at the maximum temperature when the oven dish is placed there in step 10. Step 9 is not adjusted because it relates to a manual activity of the user which is not dependent on the extended pre-heating phase. The user has now 2 min idle time before the oven dish with the raw Lasagne can be placed in the pre-heated microwave. The actual cooking/baking step 10 is adjusted according to the above formula resulting in adjusted control parameters for the temperature (200° C.) and cooking time (27:17 min) settings.

Step 11 for cooling the cream in the refrigerator at 7° C. for 20 min may also be optionally adjusted. However, this adjustment is not really needed because no matter how long the cream is cooled it cannot go below 7° C. Nevertheless, the optional adjustment, that the cooling step is delayed by 2:17 min by inserting a corresponding wait instruction for compensating the extended cooking time of step 11 illustrates how recipe adjustments may be used to keep the cooking apparatus in sync with all remote kitchen appliances. A person skilled in the art can apply this concept to any other remote kitchen appliance and the respective control parameters so that in case of executing a recipe program with registered kitchen appliances always leads to a reproducible cooking result for the respective food product.

FIG. 7 is a diagram that shows an example of a generic computer device 900 and a generic mobile computer device 950, which may be used with the techniques described here. Computing device 900 relates in an exemplary embodiment to the control system 100 (cf. FIG. 1A). Computing device 950 is intended to represent various forms of mobile devices, such as personal digital assistants, cellular telephones, smart phones, and other similar computing devices. In an exemplary embodiment of this disclosure the computing device 950 may serve as a frontend control device of the control system 900. The components shown here, their connections and relationships, and their functions, are meant to be exemplary only, and are not meant to limit implementations of the present disclosures described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. In addition, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, ZigBee, WLAN, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, ZigBee or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A control system for controlling food processing steps performed by a multi-function cooking apparatus and by one or more remote kitchen appliances for preparing a food product, comprising:
   a recipe program interface configured to access on a data storage device a recipe program for preparing the food product wherein the recipe program is configured to be executed by the cooking apparatus and to synchronize food processing steps performed by the cooking apparatus with food processing steps performed by the one or more remote kitchen appliances, the recipe program including predefined technical specifications that define instructions based on technical capabilities of the cooking apparatus;
   a registration component configured to register the one or more remote kitchen appliances with the cooking apparatus in an appliance registry;
   a validation component configured to check if the one or more remote kitchen appliances are registered with the cooking apparatus in the appliance registry, and further configured to check if technical specifications of registered remote kitchen appliances comply with control parameters in respective recipe program instructions;
   wherein the control system is further configured to notify a recipe execution engine of the cooking apparatus that the recipe program cannot be executed, if at least one of the one or more remote kitchen appliances is not registered in the appliance registry, and to trigger execution of the recipe program by the cooking apparatus to initiate the corresponding food processing steps if the technical specifications of the one or more remote kitchen appliances comply with the control parameters in the recipe program instructions.

2. The control system of claim 1, wherein the registration component is configured to receive registration data for a particular remote kitchen appliance via a user interface of the cooking apparatus and to store the registration data in the appliance registry.

3. The control system of claim 2, wherein the registration data for a particular remote kitchen appliance comprises a unique code associated with the particular remote kitchen appliance received from a respective code reader.

4. The control system of claim 2, wherein the registration data includes a first data record for a first function of the particular remote kitchen appliance and a second data record for a second function of the particular remote kitchen appliance.

5. The control system of claim 1, wherein the registration component is configured to:
   discover a particular remote kitchen appliance via an exposed service interface of the particular remote kitchen appliance, and
   to receive registration data for the particular remote kitchen appliance from the exposed service interface.

6. The control system of claim 5, wherein discovery is triggered if a particular recipe program requires a not-yet-registered remote kitchen appliance capability by comparing the required capability with exposed service descriptions of available remote kitchen appliances, wherein a particular exposed service description exposes technical capabilities of the respective remote kitchen appliance.

7. The control system of claim 6, wherein discovery is successful if there is a match with at least one of the available remote kitchen appliances.

8. The control system of claim 1, wherein the validation component is further configured to check if the technical specifications of the registered remote kitchen appliances comply with control parameters in respective recipe program instructions by retrieving the technical specifications of the one or more remote kitchen appliances, and by validating if the technical specifications correspond, within predefined tolerance ranges, to respective predefined technical specifications on which the recipe program is based.

9. A cooking apparatus comprising a control system, the control system comprising:
   a recipe program interface configured to access on a data storage device a recipe program for preparing a food product wherein the recipe program is configured to be executed by a cooking apparatus and to synchronize food processing steps performed by the cooking apparatus with food processing steps performed by one or more remote kitchen appliances, the recipe program including predefined technical specifications that define instructions based on technical capabilities of the cooking apparatus;
   a registration component configured to register the one or more remote kitchen appliances with the cooking apparatus in an appliance registry;
   a validation component configured to check if the one or more remote kitchen appliances are registered with the cooking apparatus in the appliance registry, and further configured to check if technical specifications of registered remote kitchen appliances comply with control parameters in respective recipe program instructions;
   wherein the control system is further configured to notify a recipe execution engine of the cooking apparatus that the recipe program cannot be executed, if at least one of the one or more remote kitchen appliances is not registered in the appliance registry, and to trigger execution of the recipe program by the cooking apparatus to initiate the corresponding food processing steps if the technical specifications of the one or more remote kitchen appliances comply with the control parameters in the recipe program instructions.

10. A method to control food processing steps performed by a cooking apparatus and by one or more remote kitchen appliances for preparing a food product, the method comprising:
   providing, to the cooking apparatus, machine readable program instructions of a recipe program for preparing the food product wherein the recipe program is configured to be executed by the cooking apparatus and to synchronize food processing steps performed by the cooking apparatus with food processing steps performed by the one or more remote kitchen appliances, the recipe program including predefined technical specifications that define instructions based on technical capabilities of the cooking apparatus;
   checking, by a validation component, if the one or more remote kitchen appliances are registered with the cooking apparatus;
   if at least one of the one or more remote kitchen appliances is not registered, notifying a recipe execution engine of the cooking apparatus that the recipe program cannot be executed;
   if the one or more remote kitchen appliances are registered, checking, by the validation component, if technical specifications of the one or more remote kitchen appliances comply with control parameters in respective recipe program instructions;
   if the technical specifications of the one or more remote kitchen appliances comply with the control parameters in the recipe program instructions, triggering execution of the recipe program by the cooking apparatus to initiate the corresponding food processing steps.

11. The method of claim 10, further comprising:
if checking reveals that the recipe program requires a not-yet-registered remote kitchen appliance capability, triggering a discovery by comparing the required capability with exposed service descriptions of available remote kitchen appliances, wherein a particular exposed service description exposes technical capabilities of the respective remote kitchen appliance.

12. The method of claim 11, further comprising:
if there is a match with a particular one of the available remote kitchen appliances, receiving registration data for the particular remote kitchen appliance from an exposed service interface of the particular remote kitchen appliance and storing the received registration data in an appliance registry.

13. The method of claim 12, wherein the received registration data includes a first data record for a first function of the particular remote kitchen appliance and a second data record for a second function of the particular remote kitchen appliance.

14. A non-transitory computer-readable medium for controlling food processing steps performed by a multi-function cooking apparatus and food processing steps performed by one or more remote kitchen appliances, comprising instructions that when loaded into a memory of a control system and being executed by at least one processor of the control system cause the control system to perform the method steps:
providing, to the cooking apparatus, machine readable program instructions of a recipe program for preparing the food product wherein the recipe program is configured to be executed by the cooking apparatus and to synchronize food processing steps performed by the cooking apparatus with food processing steps performed by the one or more remote kitchen appliances the recipe program including predefined technical specifications that define instructions based on technical capabilities of the cooking apparatus;
checking, by a validation component, if the one or more remote kitchen appliances are registered with the cooking apparatus;
if at least one of the one or more remote kitchen appliances is not registered, notifying a recipe execution engine of the cooking apparatus that the recipe program cannot be executed;
if the one or more remote kitchen appliances are registered, checking, by the validation component, if technical specifications of the one or more remote kitchen appliances comply with control parameters in respective recipe program instructions;
if the technical specifications of the one or more remote kitchen appliances comply with the control parameters in the recipe program instructions, triggering execution of the recipe program by the cooking apparatus to initiate the corresponding food processing steps.

15. The non-transitory computer-readable medium of claim 14, further comprising instructions that cause the control system to perform:
if checking reveals that the recipe program requires a not-yet-registered remote kitchen appliance capability, triggering a discovery by comparing the required capability with exposed service descriptions of available remote kitchen appliances, wherein a particular exposed service description exposes technical capabilities of the respective remote kitchen appliance.

16. The non-transitory computer-readable medium of claim 15, further comprising:
if there is a match with a particular one of the available remote kitchen appliances, receiving registration data for the particular remote kitchen appliance from an exposed service interface of the particular remote kitchen appliance and storing the received registration data in an appliance registry.

17. The non-transitory computer-readable medium of claim 16, wherein the received registration data includes a first data record for a first function of the particular remote kitchen appliance and a second data record for a second function of the particular remote kitchen appliance.

* * * * *